(12) United States Patent
Wang et al.

(10) Patent No.: US 10,875,075 B2
(45) Date of Patent: Dec. 29, 2020

(54) AUTOMATIC FEEDING SYSTEM

(71) Applicants: Tyco Electronics (Shanghai) Co. Ltd., Shanghai (CN); TE Connectivity Corporation, Berwyn, PA (US)

(72) Inventors: Changjun Wang, Shanghai (CN); Dandan Zhang, Shanghai (CN); Roberto Francisco-Yi Lu, Bellevue, WA (US); Yingcong Deng, Shanghai (CN); Lvhai Hu, Shanghai (CN)

(73) Assignees: Tyco Electronics (Shanghai) Co. Ltd., Shanghai (CN); TE Connectivity Corporation, Berwyn, PA (US)

( * ) Notice: Subject to any disclaimer, the term of this patent is extended or adjusted under 35 U.S.C. 154(b) by 0 days.

(21) Appl. No.: 16/212,769

(22) Filed: Dec. 7, 2018

(65) Prior Publication Data
US 2019/0176210 A1    Jun. 13, 2019

(30) Foreign Application Priority Data
Dec. 8, 2017   (CN) .......................... 2017 1 1303060

(51) Int. Cl.
*B21D 43/00* (2006.01)
*B21D 43/18* (2006.01)
(Continued)

(52) U.S. Cl.
CPC ............ *B21D 43/18* (2013.01); *B23P 19/001* (2013.01); *B23P 19/002* (2013.01); *B25J 9/1669* (2013.01); *B25J 9/1697* (2013.01); *B25J 13/08* (2013.01)

(58) Field of Classification Search
CPC ........ B21D 43/00; B21D 43/02; B31D 43/18; B31D 43/20; B23P 19/00; B23P 19/001; B23P 19/002; B23P 19/004; B23P 19/008
See application file for complete search history.

(56) References Cited

U.S. PATENT DOCUMENTS 3,527,087 A * 9/1970 Converse .............. G01M 15/02
                                                    73/116.02
4,004,678 A * 1/1977 Hardy .................. B65G 15/105
                                                    198/460.2

(Continued)

FOREIGN PATENT DOCUMENTS

WO   WO 2017/154719    * 9/2017 ............. B65G 47/31

*Primary Examiner* — Lynn E Schwenning
(74) *Attorney, Agent, or Firm* — Barley Snyder (57) ABSTRACT

An automatic feeding system adapted to arrange a variety of components having different shapes comprises a storage apparatus and a first conveying device. The storage apparatus includes loaded storage devices loaded with the components and unloaded storage devices unloaded with the components. The first conveying apparatus includes a pair of first support frames disposed opposite to each other, a loading conveying apparatus mounted between the first support frames and configured to convey the unloaded storage devices to a loading position to load the components thereon and change the unloaded storage devices to loaded storage devices, and an unloading conveying apparatus mounted between the first support frames and configured to receive the loaded storage devices conveyed from the loading position. The unloading conveying apparatus conveys the unloaded storage devices to the loading conveying apparatus after the components on the loaded storage devices are picked up by a pick-up apparatus.

21 Claims, 9 Drawing Sheets

(51) Int. Cl.
  B23P 19/00  (2006.01)
  B25J 9/16  (2006.01)
  B25J 13/08  (2006.01)

(56) References Cited

U.S. PATENT DOCUMENTS

| | | | | |
|---|---|---|---|---|
| 4,667,804 | A * | 5/1987 | Dubuit | B41F 15/0872 198/345.3 |
| 4,947,978 | A * | 8/1990 | Rhodes | B23Q 7/1457 198/341.02 |
| 5,813,195 | A * | 9/1998 | Nielsen | B65B 1/32 53/443 |
| 6,370,447 | B1 * | 4/2002 | Miyazaki | B65G 43/10 198/349.8 |
| 6,540,064 | B1 * | 4/2003 | Bodewes | B61B 13/00 198/346.1 |
| 7,035,714 | B2 * | 4/2006 | Anderson | B65G 13/02 198/358 |
| 8,096,408 | B2 * | 1/2012 | Deyanov | B65G 21/00 198/345.3 |
| 9,895,775 | B2 * | 2/2018 | Koscielski | B23K 11/115 |
| 2005/0065641 | A1 * | 3/2005 | Nagai | B65G 43/10 700/230 |
| 2009/0110522 | A1 * | 4/2009 | Criswell | B65G 67/08 414/398 |

\* cited by examiner

AUTOMATIC FEEDING SYSTEM

CROSS-REFERENCE TO RELATED APPLICATION

This application claims the benefit of the filing date under 35 U.S.C. § 119(a)-(d) of Chinese Patent Application No. 201711303060.0, filed on Dec. 8, 2017.

FIELD OF THE INVENTION

The present invention relates to an automatic feeding system and, more particularly, to an automatic feeding system for arranging a variety of components having different shapes.

BACKGROUND

Electronic devices such as electrical connectors, fiber optic connectors, relays, and the like include many components such as housings, conductive terminals, springs, bolts, insulating blocks, and the like. During manufacturing of the electronic devices, these components having different shapes and different functions need to be prepared in advance, and then these components are selected according to a preset program by manual operation or robot operation. The selected components are placed on a console and assembled into electronic devices.

A feeding system has been developed which can identify the components to be dispensed, pick up the respective components according to the result of the identification, and regularly place the picked components on a storage tray, thereby preparing the components of an electronic equipment to be assembled in advance. However, this feeding system cannot quickly place large quantities of components on the storage tray, impairing work efficiency.

SUMMARY

An automatic feeding system adapted to arrange a variety of components having different shapes comprises a storage apparatus and a first conveying device. The storage apparatus includes loaded storage devices loaded with the components and unloaded storage devices unloaded with the components. The first conveying apparatus includes a pair of first support frames disposed opposite to each other, a loading conveying apparatus mounted between the first support frames and configured to convey the unloaded storage devices to a loading position to load the components thereon and change the unloaded storage devices to loaded storage devices, and an unloading conveying apparatus mounted between the first support frames and configured to receive the loaded storage devices conveyed from the loading position. The unloading conveying apparatus conveys the unloaded storage devices to the loading conveying apparatus after the components on the loaded storage devices are picked up by a pick-up apparatus.

BRIEF DESCRIPTION OF THE DRAWINGS

The invention will now be described by way of example with reference to the accompanying Figures, of which.

DETAILED DESCRIPTION OF THE EMBODIMENT(S)

Embodiments of the present invention will be described hereinafter in detail with reference to the attached drawings, wherein like reference numerals refer to the like elements. The present invention may, however, be embodied in many different forms and should not be construed as being limited to the embodiments set forth herein; rather, these embodiments are provided so that the disclosure will be thorough and complete and will fully convey the concept of the invention to those skilled in the art.

An automatic feeding system 100 according to an embodiment is shown in FIGS. 1-4. The automatic feeding system 100 is adapted to arrange a variety of components (not shown) having different shapes and includes a storage apparatus 4 configured to store a plurality of components and a first conveying device 8 for conveying the storage apparatus 4.

The storage apparatus 4, as shown in FIGS. 5-8, includes loaded storage devices 41 loaded with the components and unloaded storage devices 42 unloaded with the components.

Figure 1:
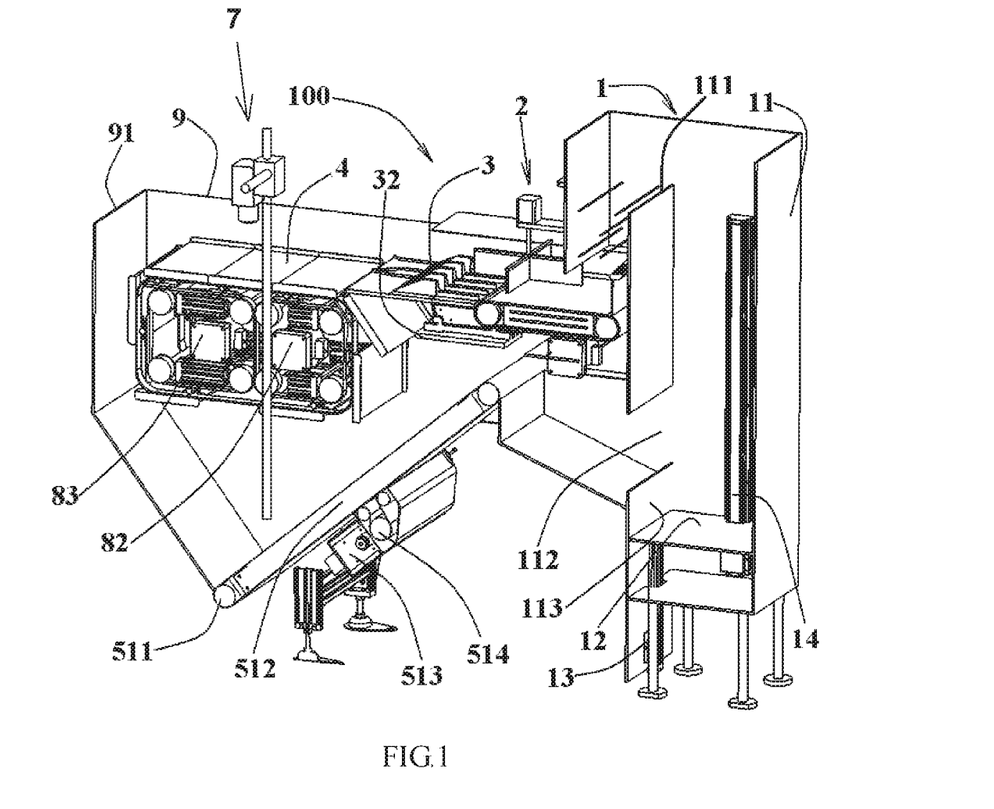
FIG. 1 is a perspective view of an automatic feeding system according to an embodiment.
Figure 2:
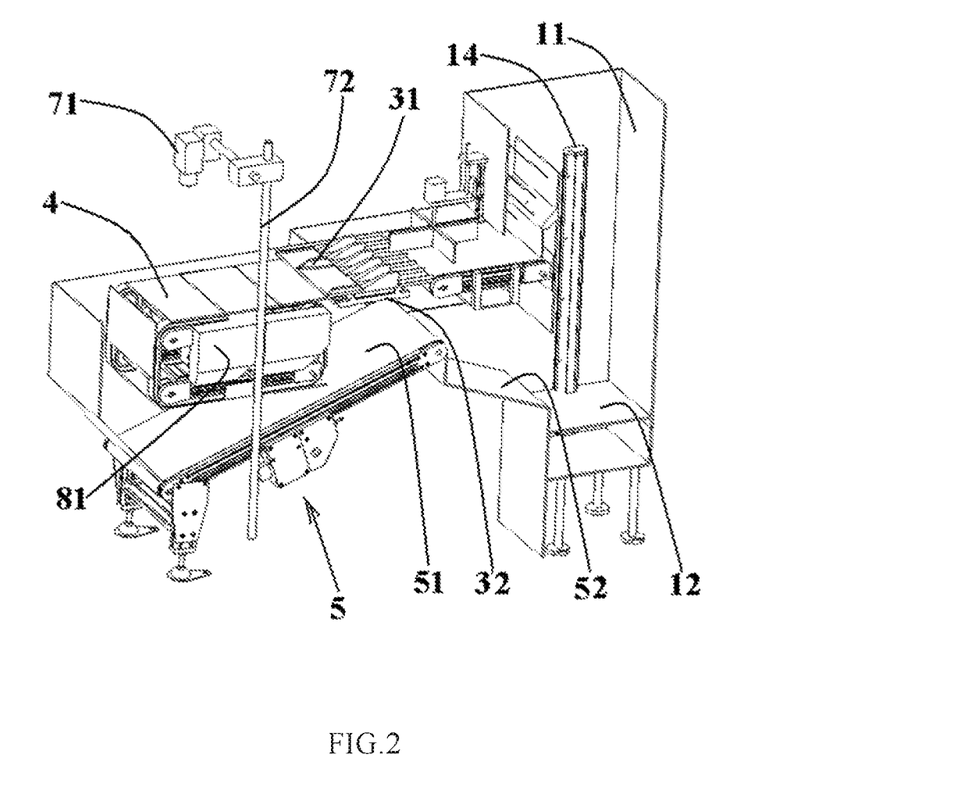
FIG. 2 is a perspective view of the automatic feeding system with the sidewalls of the automatic feeding system removed.

The first conveying apparatus 8, as shown in FIGS. 1 and 2, includes two first support frames 81 opposite to each other, a loading conveying apparatus 82 mounted between the two first support frames 81, and an unloading conveying apparatus 83 mounted between the two first support frames 81. The loading conveying apparatus 82 is configured to convey the unloaded storage devices 42 to a loading position to load the components thereon, so that the unloaded storage devices 42 become the loaded storage devices 41. The unloading conveying apparatus 83 is configured to receive the loaded storage devices 41 conveyed from the loading position such that the components on the loaded storage devices 41 are picked up by a pick-up apparatus 6, shown in FIG. 9, and the loaded storage devices 41 become the unloaded storage devices 42. The unloading conveying apparatus 83 then conveys the unloaded storage devices 42 to the loading conveying apparatus 82 which then conveys the unloaded storage devices 42 to the loading position, so as to prepare for the next loading. The loaded storage devices 41 and the unloaded storage devices 42 are conveyed by the first conveying apparatus 8 at different moving speeds so as to perform the loading operation and the unloading operation to the storage apparatus 4.

The storage apparatus 4 may be converted between the loaded state and the unloaded state and, in an embodiment, is a tray, an upper surface of which has a plurality of grooves for placing the components so as to position the components.

The first conveying device 8 is configured to circularly convey the loaded storage devices 41 and the unloaded storage devices 42. During operation, the first conveying device 8 is adapted to convey the unloaded storage devices 42 to the loading position, the right position in FIG. 5, and receive the components from a posture adjusting apparatus 3 shown in FIG. 1 such that the unloaded storage devices 42 are changed into the loaded storage devices 41. The first conveying device 8 is further adapted to convey the loaded storage devices 41 to a pickup position, an intermediate position in FIG. 5, where the pick-up apparatus 6 is adapted to pick up the components on the loaded storage devices 41 so that the loaded storage devices 41 are converted into the unloaded storage devices 42. Thereafter, the first conveying device 8 is adapted to convey the unloaded storage devices 42 to the loading position, thus performing the cyclic operation.

The automatic feeding system 100, as shown in FIGS. 1-4, comprises a loading apparatus 1 configured to provide the variety of components, a dispersing apparatus 2 configured to disperse the components, which are unloaded from the loading apparatus 1 and gathered together, into a plurality of separated components, and the posture adjusting apparatus 3 configured to adjust the components received from the dispersing apparatus 2 to a predetermined posture. In an embodiment, the posture adjusting apparatus 3 adjusts the components to a posture in which the components are all disposed parallel to a moving direction of the components. The component in the predetermined posture is further moved from the posture adjusting apparatus 3 to the storage apparatus 4.

In an embodiment, the components are suitable to be assembled into electronic devices such as electrical connectors, fiber optic connectors, relays, and the components may include housings, conductive terminals, springs, bolts, insulating blocks, wires, etc. that are mixed together. Different types of components have different shapes, sizes, flexibility, functions and the like. The storage apparatus 4 stores the component having the predetermined posture, and the component having the predetermined posture or the storage apparatus 4 loaded with the predetermined component may be picked up by the pick-up apparatus 6, such as a robot, so as to prepare for the subsequent operation.

The automatic feeding system 100, as shown in FIGS. 1-4, further comprises a recycling apparatus 5 configured to convey the components dropped from the dispersing apparatus 2, the posture adjusting apparatus 3 and the storage apparatus 4 to the loading apparatus 1 so as to perform another process to the dropped components.

The loading conveying apparatus 82, as shown in FIGS. 1, 2, and 5-8, includes a first conveyor belt 821, a plurality of first rotatory rollers 822 mounted on the first support frame 81 and configured to drive the first conveyor belt 821 to move circularly, and a first motor 823 mounted on the first support frame 81 and configured to drive at least one of the plurality of first rotatory rollers 822 to rotate. The unloading conveying apparatus 83 includes a second conveyor belt 831, a plurality of second rotatory rollers 832 mounted on the first support frame 81 and configured to drive the second conveyor belt 831 to move circularly, and a second motor 833 mounted on the first support frame 81 and configured to drive at least one of the plurality of second rotatory rollers 832 to rotate. The loading conveying apparatus 82 and the unloading conveying apparatus 83 are operated separately so as to drive the storage apparatus 4 at different speeds.

In an embodiment, the first conveying apparatus 8 further includes a detecting assembly configured to detect a state of the storage apparatus 4 located on the unloading conveying apparatus 83. The second motor 833 is configured to, in the case where the detecting assembly detects a loaded state of the storage apparatus 4, stop the rotation thereof such that the components loaded on the storage apparatus 4 are picked up by the pick-up apparatus 6, facilitating the operation of picking up the components. In the case where the detecting assembly detects an unloaded state of the storage apparatus 4, the second motor 833 is adapted to drive the second conveyor belt 831 to move at a speed higher than that of the first conveyor belt 821 such that the unloaded storage devices 42 may be quickly moved to the loading position on the loading conveying apparatus 82. The first motor 823 may be controlled to rotate at a predetermined speed so that the components are evenly arranged on the storage apparatus 4. Thus, the components having the predetermined posture may be continuously picked up from the loaded storage devices 41, the time during which the pick-up apparatus 6 is idle is reduced, and the components are continuously loaded to the unloaded storage devices 42. In an embodiment, the second motor 833 is a stepper motor.

Figure 5:
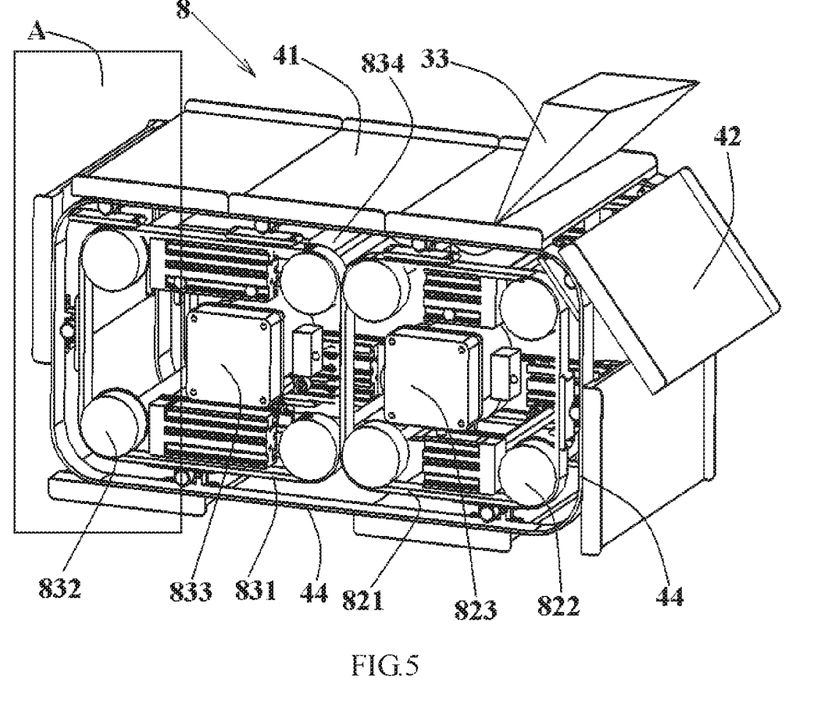
FIG. 5 is a perspective view of a first conveying device of the automatic feeding system.
Figure 6:
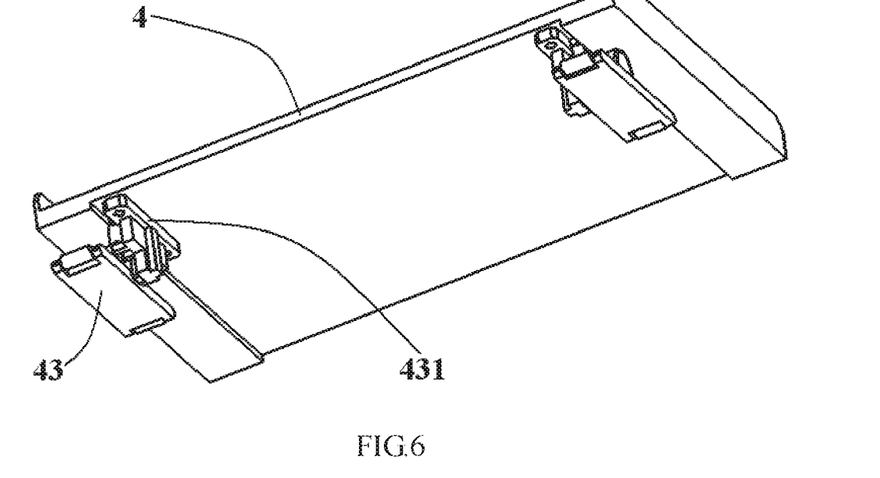
FIG. 6 is a perspective view of a storage device and engaging devices of the automatic feeding system.

As shown in FIG. 5, the detecting assembly includes a light source 834 mounted within the first support frames 81 and configured to emit light to the storage apparatus 4, and a light receiver mounted above the storage apparatus 4 and configured to determine the loaded state or unloaded state of the components on the storage apparatus 4 based on a light beam received from the light source 834 through the storage apparatus 4. In an embodiment, the light source 834 is disposed below the storage apparatus 4 and configured to illuminate the storage apparatus 4. A camera 71, such as a charge-coupled device (CCD) camera, disposed above the storage apparatus 4 is used as the light receiver and is adapted to analyze and compare the acquired images of the storage apparatus 4 so as to determine the loaded state or the unloaded state of the components on the storage apparatus 4. In an alternative embodiment, the detecting assembly may include a weight sensor mounted on a second rotatory roller located at an upper portion.

The first conveying apparatus 8 comprises, as shown in FIGS. 5-8, a plurality of engaging devices 43 and at least one guide rail 44. In the shown embodiment, the first conveying apparatus 8 includes two guide rails 44. Each of the plurality of engaging devices 43 is configured to engage the storage device 4, whether a loaded storage device 41 or an unloaded storage device 42, to the first conveyor belt 821 or the second conveyor belt 831, such that each of the plurality of engaging devices 43 is driven to move circularly by the first conveyor belt 821 or the second conveyor belt 831. Two guide rails 44 are mounted on the first support frames 81 and surround the first conveyor belt 821 and the second conveyor belt 831; the guide rail 44 is slidably engaged to the storage apparatus 4 such that the storage apparatus 4 is held on the guide rail 44 while moving circularly with the first conveyor belt 821 or the second conveyor belt 831. The storage apparatus 4 is moved with respect to the guide rail 44 so as to move circularly under the guidance of the guide rail 44; however, in the case where the storage apparatus 4 is engaged to the first conveyor belt 821 or the second conveyor belt 831, the storage apparatus 4 is moved together with the first conveyor belt 821 or the second conveyor belt 831.

Figure 7:
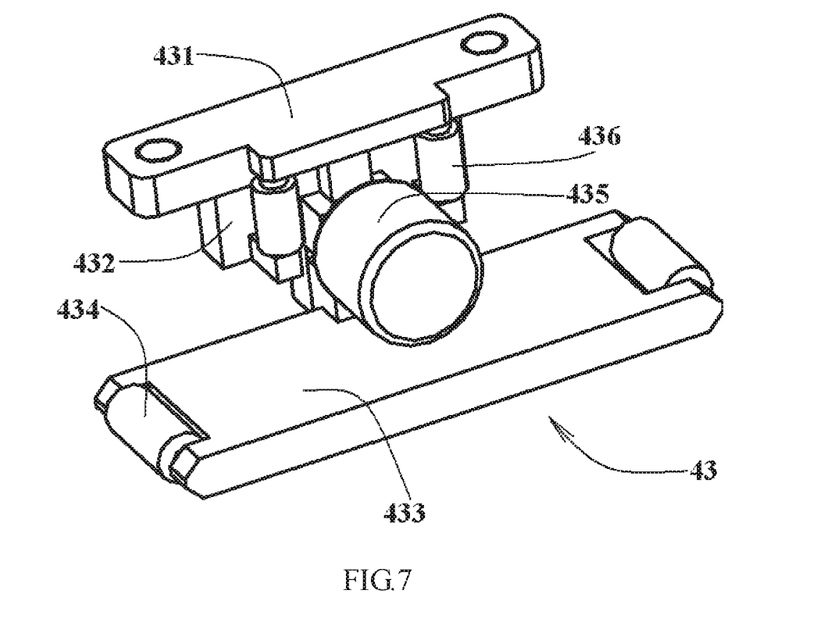
FIG. 7 is a perspective view of the engaging device.
Figure 8:
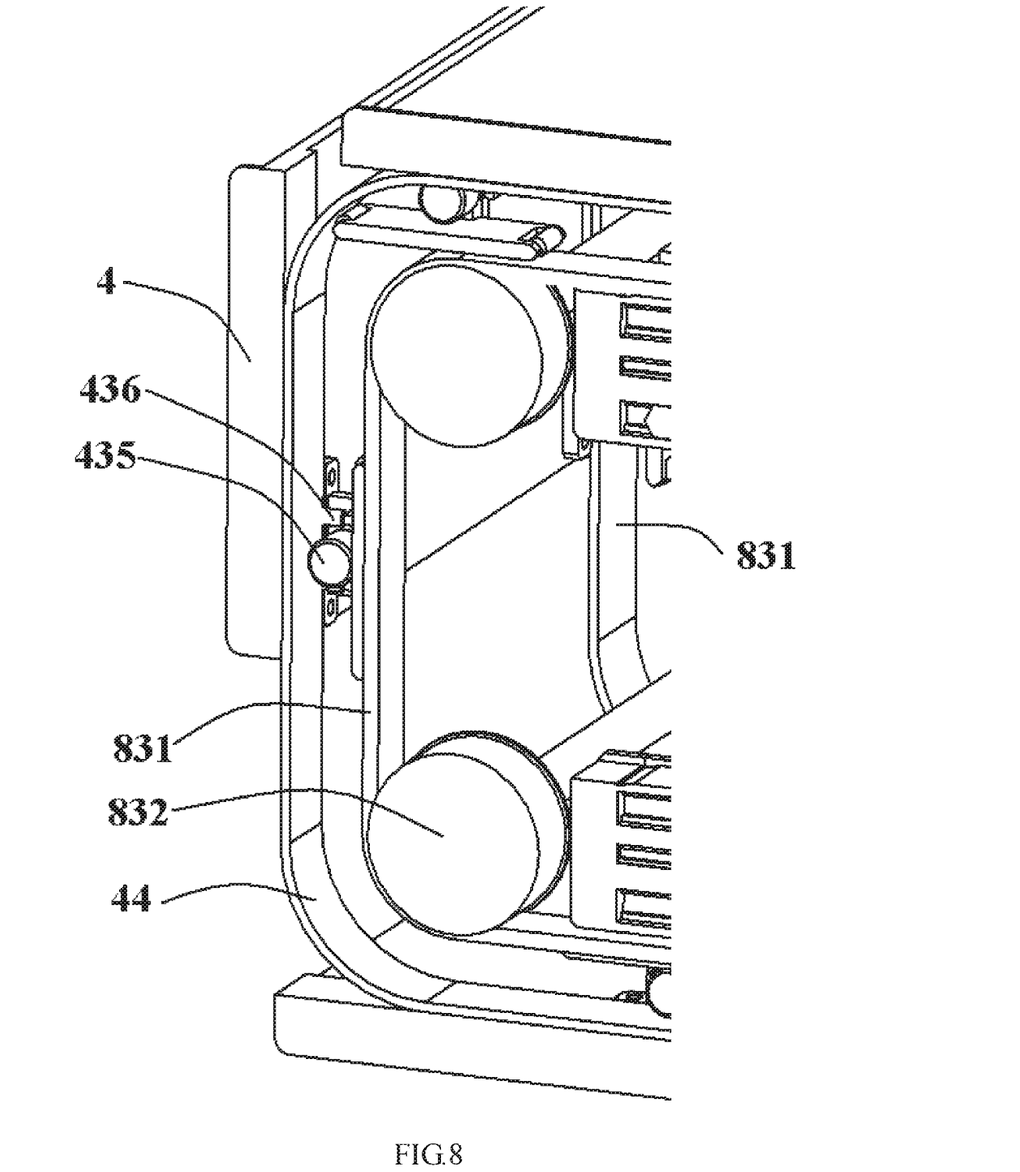
FIG. 8 is a perspective view of a portion A of FIG. 5.

Each of the plurality of engaging devices 43, as shown in FIG. 7, includes a base 431, a driven mechanism, and a holding mechanism. The base 431 is configured to be mounted on the storage apparatus 4 by a bolt. The driven mechanism is configured to engage with the first conveyor belt 821 and/or the second conveyor belt 831, such that the engaging device 43 is driven to move by the first conveyor belt 821 or the second conveyor belt 831. The holding mechanism is configured to hold the guide rail 44 on the engaging device 43, such that the storage apparatus 4 is driven to move circularly along the guide rail 44 by the first conveyor belt 821 or the second conveyor belt 831.

As shown in FIG. 7, the driven mechanism includes a sliding plate 433. The sliding plate 433 is configured to press against the first conveyor belt 821 or the second conveyor belt 831 so as to be driven by a frictional force between the sliding plate 433 and the first conveyor belt 821 and/or a frictional force between the sliding plate 433 and the second conveyor belt 831. A length of the sliding plate 433 is provided to be long enough to extend over a gap between the first conveyor belt 821 and the second conveyor belt 831, such that the sliding plate 433 is continuously driven between the first conveyor belt 821 and the second conveyor belt 831. The sliding plate 433 is provided with first wheels 434 at opposite ends thereof such that the sliding plate 433 is conveyed smoothly between the first conveyor belt 821 and the second conveyor belt 831. For example, during transfer of the sliding plate 433 from the first conveyor belt 821 to the second conveyor belt 831, the first wheel 434 at one end of the sliding plate 433 first comes into contact with the second conveyor belt 831 after separating from the first conveyor belt 821. Due to the rolling of the wheel 434, the sliding plate 433 may be smoothly engaged with the second conveyor belt 831. However, it should be understood that, in the case where the sliding plate 433 has completely moved to the first conveyor belt 821 or the second conveyor belt 831, the first wheels 434 will no longer contact the first conveyor belt 821 or the second conveyor belt 831, such that the sliding plate 433 is driven by a frictional force between the sliding plate 433 and the first conveyor belt 821 and/or a frictional force between the sliding plate 433 and the second conveyor belt 831.

As shown in FIG. 7, the holding mechanism includes a bracket 432 mounted between the base 431 and the sliding plate 433 and a guiding mechanism mounted to the bracket 432 between the base 431 and the sliding plate 433. The guide rail 44 is held between the guiding mechanism and a bottom of the base 431 or the storage apparatus 4 such that the guide rail 44 may guide the sliding plate to move in the moving direction. Further, the guiding mechanism includes a second wheel 435 mounted on the bracket 432 and extending from the bracket 432 parallel to and above the sliding plate 433, and the guide rail 44 is held between the second wheel 435 and the bottom of the base 431. By providing the second wheel 435, it is possible to prevent the guide rail 44 from interfering with the guiding mechanism and the base 431 and from affecting the movement of the storage apparatus 4. In an alternative embodiment, the guiding mechanism 435 is a smooth slider.

In an embodiment, the holding mechanism includes a resilient mechanism provided between the second wheel 435 and a bottom of the storage apparatus 4 and configured such that the guide rail 44 is in close contact with the second wheel 435 and no jumping phenomenon occurs during the movement of the storage apparatus 4. For example, a support shaft of the second wheel 435 may be provided as a resilient mechanism, or a compression spring for biasing the second wheel 435 toward the base 431 or the storage apparatus 4 may be provided in the bracket 432.

The holding mechanism, as shown in FIG. 7, includes a pair of third wheels 436 mounted on the bracket 432 perpendicular to the sliding plate 433 and located on both sides of the second wheel 435. The pair of third wheels 436 press against an inner edge of the guide rail 44 so as to guide the plurality of engaging devices 43 and the storage apparatus 4 to move circularly along the guide rail 44.

The loading apparatus 1, as shown in FIGS. 1 and 2, includes a casing 11. An upper portion of a side wall of the casing 11 has a notch 111. The components to be operated are placed into the casing 11 in advance through an upper opening of the casing 1. A lifting mechanism is mounted in the casing 11 and is movable up and down so that the lifted components fall from the notch 111 to the outside of the casing 11 and fall onto the dispersing apparatus 2 when going beyond the notch 111. The height of the casing 11 and the notch 111 are set higher than the height of the dispersing apparatus 2. The casing 11 has a square, rectangular, other polygonal or circular cross section.

The lifting mechanism, as shown in FIGS. 1 and 2, includes a drive mechanism 13, a moving tray 12 mounted in the casing 11 and configured to move up and down within the casing 11 under the drive of the drive mechanism 13, and a guiding assembly 14. The guiding assembly 14 may be a guiding rod installed in the casing 1 and is configured to guide the moving tray 12 to move up and down. For example, the drive mechanism 13 may drive the moving tray 12 to move by a conveyor belt driven by a motor, or a worm and gear set driven by a motor, so that the speed at which the moving tray 12 lifts the components may be controlled by controlling the drive mechanism 13.

A lower portion of the side wall of the casing 11, as shown in FIG. 1, has a recycling port 112. The recycling port 112 is provided with a shutter 113, which is constructed to be driven to open or close the recycling port 112, such that the recovered components are conveyed into the casing 11 through the opened recycling port 112 when the moving tray 12 is moved to the lower portion of the casing 11. For example, the extension or contraction of the shutter 113 may be driven by electromagnetic attraction so as to close or open the recycling port 112. In this way, the components that are not picked up by the pick-up apparatus 6 in one cycle operation may be re-entered into the next cycle operation until they are finally picked up.

Figure 3:
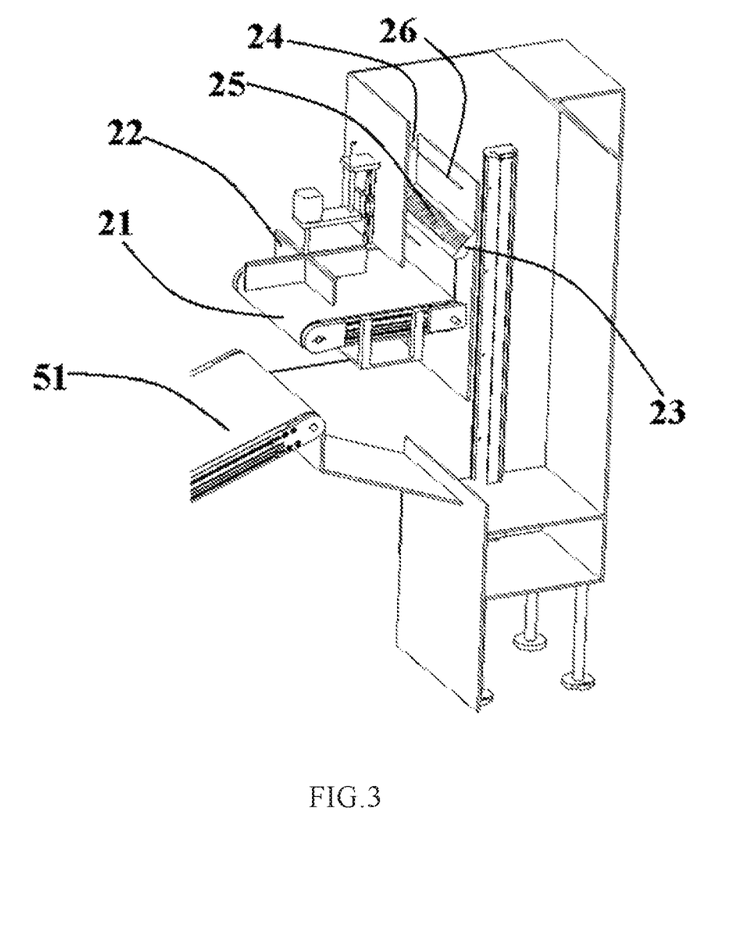
FIG. 3 is a perspective view of a dispersing apparatus and a recycling apparatus of the automatic feeding system.
Figure 4:
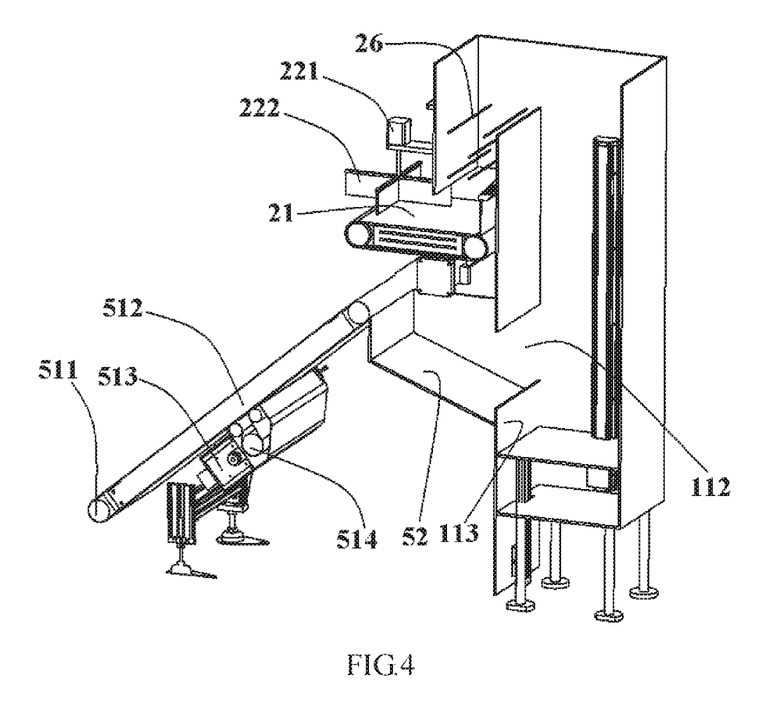
FIG. 4 is a perspective view of a loading apparatus, the dispersing apparatus, and the recycling apparatus of the automatic feeding system.

The recycling apparatus 5, as shown in FIGS. 1-4, includes a second conveying device 51 disposed below the dispersing apparatus 2, the posture adjusting apparatus 3, and the storage apparatus 4 to receive the components dropped therefrom. The second conveying device 51 conveys the received components to the loading apparatus 1 for re-processing. In an embodiment, the second conveying device 51 is tilted upwardly from a first end away from the loading apparatus 1 to a second end adjacent the loading apparatus 1. The second conveying device 51 includes, as shown in FIG. 4, a plurality of third rotatory rollers 511 disposed in parallel, a third conveyor belt 512 mounted on the third rotatory rollers 511, a third motor 513 mounted below the third conveyor belt 512, and a drive roller 514, which is driven to rotate by the third motor 513 and thus further drives the conveyor belt 512 to move.

The recycling apparatus 5 further includes an inclined plate 52 shown in FIG. 2, which is disposed between the second end of the second conveying device 51 and the recycling port 112 of the casing 11 and inclined downwardly from the second end of the second conveying device 51 to the recycling port 112 of the casing 11. The recovered components move upward on the second conveying device 51, then move downward on the inclined plate 52, and finally slide down onto the moving tray 12 in the casing 11. With this configuration, the length of the second conveying device 51 may be shortened and the operation of the shutter 113 may be facilitated. In an alternative embodiment, the second conveying device 51 may extend to the recycling port 112.

Figure 9:
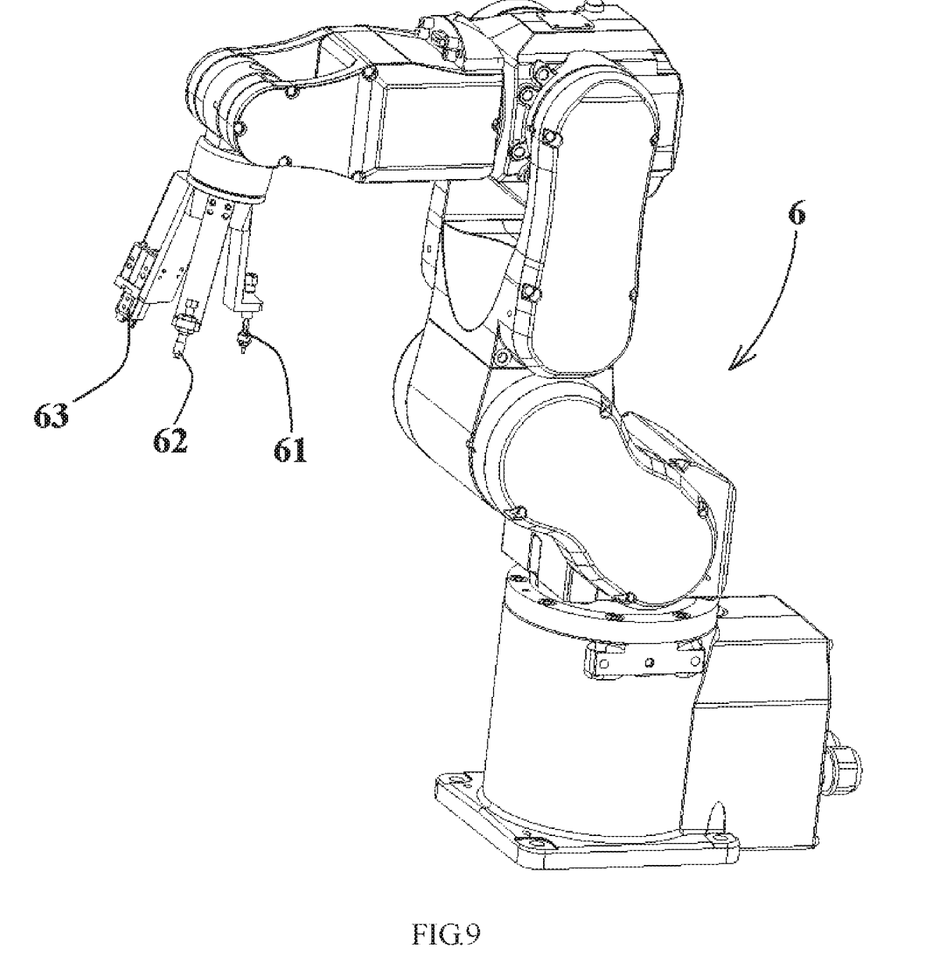
FIG. 9 is a perspective view of a robot of the automatic feeding system.

The automatic feeding system 100 includes the pick-up apparatus 6 shown in FIG. 9. The pick-up apparatus 6 is configured to pick up components from the storage apparatus 4 and assemble the picked components to a predetermined position, such as move the component to a production line so as to be assembled into electronic devices. The pick-up apparatus 6 is a robot and includes a plurality of grippers 61-63 for picking up components having different shapes. Embodiments of the robot 6 include, but are not limited to, a four-axis, six-axis robot, or other type of multi-degree of freedom robot. In an exemplary embodiment, the gripper 61 has a larger suction cup for grasping the conductive terminals, the gripper 62 has a smaller suction cup for grasping the wires, and the gripper 63 includes a plurality of arms for grasping larger components, such as a housing of an electrical connector. One or more different types of grippers 61-63 may be mounted on the robot as required.

The automatic feeding system 100, as shown in FIGS. 1 and 2, includes an identifying apparatus 7 configured to identify the type and posture of components on the storage apparatus 4 and to pick up the respective component based on an identification result. The identifying apparatus 7 includes a second support frame 72 and the camera 71 mounted on the support frame 72 and configured to identify an image of the components stored on the storage apparatus 4. The pick-up apparatus 6 may thus identify the image of the component captured by the camera 71 according to a pre-programmed program, thereby controlling the gripper 61-63 to grab the respective component. Since the components on the storage apparatus 4 have a predetermined posture, the grasping operation of the robot may be facilitated, and it is unnecessary to adjust the robot grasping manner for different postures of the components before the grabbing operation.

The posture adjusting apparatus 3, as shown in FIGS. 1, 2, 10, and 11, includes a vibration disk 31 mounted at one end of the storage apparatus 4 close to the dispersing apparatus 2 and a drive device 32 mounted below the vibration disk 31 and configured to drive the vibration disk 31 to generate vibration such that the components are arranged in a predetermined posture on the vibration disk 31. In an embodiment, in the predetermined posture, the components are arranged in a direction parallel or perpendicular to the moving direction of the storage apparatus 4.

In an embodiment, the drive device 32 drives the vibrating plate 31 to generate vibration in a pulsed manner. In an exemplary embodiment, the drive device 32 includes a vibrating head with an electromagnetic excitation mechanism disposed within the drive device 32. In the case where a pulse voltage is applied, the vibrating head may be rapidly expanded and contracted, and strike the lower portion of the vibrating plate 31 in an extended state, thereby causing the vibrating plate 31 to vibrate, and further causing the components placed on the vibrating plate 31 to jump. In this way, the posture of the component is changed, for example, flipped, rotated, and finally moved from the vibrating plate 31 through an inclined conveying mechanism 33 shown in FIG. 5 to the storage apparatus 4 in a predetermined posture, facilitating the identifying apparatus 7 to identify the component and the pick-up apparatus 6 to pick up the component.

Figure 10:
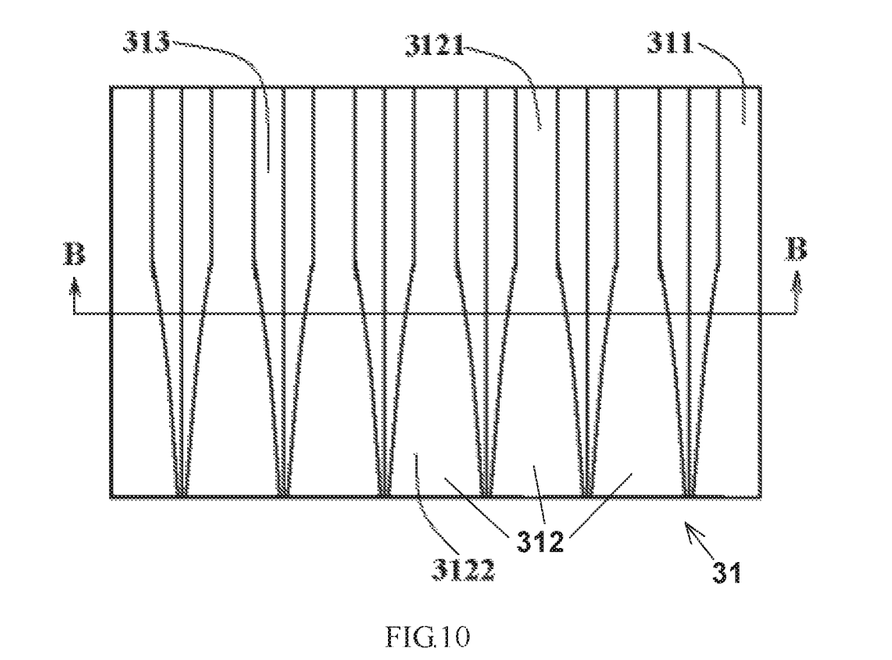
FIG. 10 is a plan view of a vibration disk of a posture adjusting apparatus of the automatic feeding system.
Figure 11:
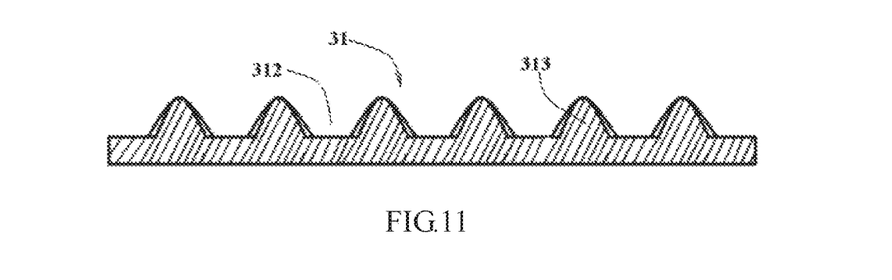
FIG. 11 is a sectional end view of the vibration disk, taken along line B-B of FIG. 10.

As shown in FIGS. 10 and 11, the vibration disk 31 includes a bottom plate 311 and a plurality of positioning grooves 312. The bottom plate 311 is inclined upward in a direction away from the storage apparatus 4 so that the component gradually moves toward the storage apparatus 4 due to the vibration of the vibration disk 31. The plurality of positioning grooves 312 arranged in parallel are formed on the bottom plate 311 in a predetermined extension direction. The components gradually fall into the positioning grooves 312 while gradually moving toward the storage apparatus 4 due to the vibration of the vibration disk 31, such that the components are arranged in a predetermined posture on the vibration disk 31, for example, in a direction parallel or perpendicular to the moving direction of the storage apparatus 4.

As shown in FIGS. 10 and 11, a strip-shaped partition protrusion 313 is provided between two adjacent positioning grooves 312, and the cross-section of the partition protrusion 313 has a substantially curved shape, allowing the components to gradually fall into the positioning grooves 312 due to the vibration. Further, each positioning groove 312 includes a first portion 3121 and a second portion 3122, wherein the first portion 3121 is disposed to be adjacent to the storage apparatus 4 and has the same width, whereas the second portion 3122 extends from the first portion 3121 and extends away from the storage apparatus 4 and has a width which gradually increases in a direction away from the storage apparatus 4. Thus, the posture of the component is gradually adjusted by a plurality of vibrations, and the component is disposed in the first portion 3121 of the positioning groove 312 in the predetermined posture, and is moved to the storage apparatus 4 in this predetermined posture.

The dispersing apparatus 2, as shown in FIGS. 1, 3, and 4, includes a third conveying device 21 and a blocking mechanism 22. The third conveying device 21 is disposed at one end of the posture adjusting apparatus 3 adjacent to the loading apparatus 1 and constructed to convey the components to the posture adjusting apparatus 3. The blocking mechanism 22 is mounted above the third conveying device 21 and configured to allow only a part of the components to pass between the blocking mechanism 22 and the third conveying device 21. In this way, the components stacked on the third conveying device 21 may be separated.

The blocking mechanism 22, as shown in FIGS. 3 and 4, includes a fourth motor 221 mounted above the third conveying device 21 and a plurality of blades 221 mounted on an output shaft of the fourth motor 221 so as to be driven to rotate above the third conveying device 21 by the fourth motor 221. Thus, a part of the components stacked on the third conveying device 21 is pushed by the blades 222 to the recycling apparatus 5, and the other part thereof is moved to the posture adjusting apparatus 3. The third conveying device 21 may be a belt conveying device.

The dispensing apparatus 2, as shown in FIG. 3, includes a drop passage 24 disposed between the loading apparatus 1 and the third conveying device 21, a baffle plate 23 mounted in the drop passage 24 and provided with a plurality of air outlets 25, and a blower disposed below the baffle plate 23 to blow air through the air outlets 25 into the drop passage 24 to disperse the components. A plurality of baffles 26 are also provided in the drop passage 24 to allow the components to be further dispersed. In this way, the gathered and tangled components may be quickly dispersed to facilitate subsequent posture adjustment operations.

As shown in FIG. 1, the dispersing apparatus 2 and the posture adjusting apparatus 3 are mounted on at least one of a pair of opposing side walls 9 such that the dispersing apparatus 2, the posture adjusting apparatus 3, and the storage apparatus 4 are housed in a space defined by the pair of side walls 9, one end wall 91, and the casing 11. The recycling apparatus 5 is disposed at the bottom of the space so that components may be prevented from scattering to the outside of the automatic feeding system 100.

The automatic feed system 100 includes a central controller to control the rotational speeds of the first motor 823, second motor 833, and third motor 513. The central controller is pre-programmed so that the various components of the entire automatic feeding system 100 are coordinated with each other to improve work efficiency.

In the automatic feeding system 100, the moving speeds of the unloaded storage devices 42 and the loaded storage devices 41 may be separately controlled, thereby improving the efficiency of conveying the storage apparatus 4. Further the components may be quickly and regularly placed on the storage apparatus 4, thereby preparing the components of the electronic device to be assembled in advance and improving the automation of manufacturing the electronic device. The damage to components may be minimized throughout the entire operation.

What is claimed is:

1. An automatic feeding system adapted to arrange a variety of components having different shapes, comprising:
   a storage apparatus including a plurality of loaded storage devices loaded with the components and a plurality of unloaded storage devices unloaded with the components; and
   a first conveying apparatus including:
      a pair of first support frames disposed opposite to each other;
      a loading conveying apparatus mounted between the first support frames and configured to convey the unloaded storage devices to a loading position to load the components thereon and change the unloaded storage devices to loaded storage devices;
      an unloading conveying apparatus mounted between the first support frames and configured to receive the loaded storage devices conveyed from the loading position, the unloading conveying apparatus configured to convey the unloaded storage devices to the loading conveying apparatus after the components on the loaded storage devices are picked up by a pick-up apparatus; and
      a plurality of engaging devices each configured to slidably engage the storage devices with a guide rail of the loading conveying apparatus or the unloading carrying apparatus, each of the plurality of engaging devices includes a sliding plate frictionally engaged with and driven by the loading conveying apparatus or the unloading carrying apparatus along the guide rail.

2. The automatic feeding system of claim 1, wherein the loaded storage devices and the unloaded storage devices are conveyed by the first conveying apparatus at different moving speeds.

3. The automatic feeding system of claim 1, wherein the loading conveying apparatus includes a first conveyor belt, a plurality of first rotatory rollers mounted on the first support frame and configured to drive the first conveyor belt to move circularly, and a first motor mounted on the first support frame and configured to drive at least one of the first rotatory rollers to rotate, and the unloading conveying apparatus includes a second conveyor belt, a plurality of second rotatory rollers mounted on the first support frame and configured to drive the second conveyor belt to move circularly, and a second motor mounted on the first support frame and configured to drive at least one of the second rotatory rollers to rotate.

4. The automatic feeding system of claim 3, wherein the first conveying apparatus further comprises a detecting assembly configured to detect a state of the storage apparatus located on the unloading conveying apparatus.

5. The automatic feeding system of claim 4, wherein, when the detecting assembly detects a loaded state of the storage apparatus, the second motor is configured to stop rotation such that the components can be picked up by the pick-up apparatus, and when the detecting assembly detects an unloaded state of the storage apparatus, the second motor is configured to drive the second conveyor belt to move at a speed higher than that of the first conveyor belt.

6. The automatic feeding system of claim 4, wherein the detecting assembly includes a light source mounted within the first support frames and configured to emit light to the storage apparatus and a light receiver mounted above the storage apparatus and configured to determine the loaded state or the unloaded state of the components on the storage apparatus based on a light beam received from the light source through the storage apparatus.

7. The automatic feeding system of claim 1, further comprising:
   a loading apparatus configured to provide the variety of components;
   a dispersing apparatus configured to disperse the components unloaded from the loading apparatus into a plurality of separated components; and
   a posture adjusting apparatus configured to adjust the component received from the dispersing apparatus to a predetermined posture and move the component in the predetermined posture to the storage apparatus.

8. The automatic feeding system of claim 7, further comprising a recycling apparatus configured to convey the components dropped from the dispersing apparatus, the posture adjusting apparatus, and the storage apparatus to the loading apparatus.

9. The automatic feeding system of claim 7, further comprising an identifying apparatus configured to identify a type and a posture of the component on the storage apparatus, the pick-up apparatus is adapted to pick up a respective component based on an identification result of the identifying apparatus.

10. The automatic feeding system of claim 9, wherein the identifying apparatus includes a second support frame and a camera mounted on the second support frame, the camera is configured to identify an image of the component stored on the storage apparatus.

11. An automatic feeding system adapted to arrange a variety of components having different shapes, comprising:
   a storage apparatus including a plurality of loaded storage devices loaded with the components and a plurality of unloaded storage devices unloaded with the components; and
   a first conveying apparatus including a pair of first support frames disposed opposite to each other, a loading conveying apparatus mounted between the first support frames and configured to convey the unloaded storage devices to a loading position to load the components thereon and change the unloaded storage devices to loaded storage devices, and an unloading conveying apparatus mounted between the first support frames and configured to receive the loaded storage devices conveyed from the loading position, the unloading conveying apparatus configured to convey the unloaded storage devices to the loading conveying apparatus after the components on the loaded storage devices are picked up by a pick-up apparatus, wherein the loading conveying apparatus includes a first conveyor belt, a plurality of first rotatory rollers mounted on the first support frame and configured to drive the first conveyor belt to move circularly, and a first motor mounted on the first support frame and configured to drive at least one of the first rotatory rollers to rotate, and the unloading conveying apparatus includes a second conveyor belt, a plurality of second rotatory rollers mounted on the first support frame and configured to drive the second conveyor belt to move circularly, and a second motor mounted on the first support frame and configured to drive at least one of the second rotatory rollers to rotate, and wherein the first conveying apparatus includes:
a plurality of engaging devices each configured to engage the storage device to the first conveyor belt or the second conveyor belt, each of the plurality of engaging devices is driven by the first conveyor belt or the second conveyor belt; and
a guide rail mounted on the first support frames and surrounding the first conveyor belt and the second conveyor belt, the guide rail is slidably engaged with the storage apparatus and the storage apparatus is held on the guide rail while moving circularly with the first conveyor belt or the second conveyor belt.

12. The automatic feeding system of claim 11, wherein each of the plurality of engaging devices includes:
a base mounted on the storage apparatus;
a driven mechanism engaged with the first conveyor belt and/or the second conveyor belt, the engaging device is driven to move by the first conveyor belt or the second conveyor belt; and
a holding mechanism configured to hold the guide rail on the engaging device, the storage apparatus is driven to move circularly along the guide rail by the first conveyor belt or the second conveyor belt.

13. The automatic feeding system of claim 12, wherein the driven mechanism includes a sliding plate configured to press against the first conveyor belt or the second conveyor belt so as to be driven by a frictional force between the sliding plate and the first conveyor belt and/or a frictional force between the sliding plate and the second conveyor belt.

14. The automatic feeding system of claim 13, wherein a length of the sliding plate is sufficiently long to extend over a gap between the first conveyor belt and the second conveyor belt and the sliding plate is continuously driven between the first conveyor belt and the second conveyor belt.

15. The automatic feeding system of claim 14, wherein the sliding plate has a pair of first wheels each disposed at an opposite end of the sliding plate.

16. The automatic feeding system of claim 13, wherein the holding mechanism includes a bracket mounted between the base and the sliding plate and a guiding mechanism mounted to the bracket between the base and the sliding plate, the guide rail is held between the guiding mechanism and a bottom of the base.

17. The automatic feeding system of claim 16, wherein the guiding mechanism includes a second wheel mounted on the bracket and extending from the bracket parallel to and above the sliding plate, and the guide rail is held between the second wheel and the bottom of the base or the storage apparatus.

18. The automatic feeding system of claim 17, wherein the second wheel is resiliently mounted with respect to a portion of the holding mechanism for maintaining close contact between the guide rail and the second wheel.

19. The automatic feeding system of claim 18, wherein the holding mechanism includes a pair of third wheels mounted on the bracket, extending in a direction perpendicular to the sliding plate, and disposed on opposite sides of the second wheel, the third wheels press against an inner edge of the guide rail so as to guide the engaging devices and the storage apparatus to move circularly along the guide rail.

20. An automatic feeding system, comprising:
a plurality of storage trays; and
a conveying system comprising:
a loading conveyor defining a first continuous loop and including a first motor, the loading conveyor configured to convey an unloaded one of the plurality of storage trays to a loading position for loading components thereon; and
a unloading conveyor defining a second continuous loop and including a second motor, the unloading conveyor configured to, while operating in a first direction, receive a loaded one of the plurality of storage trays from the loading position and to convey an unloaded storage tray to the loading conveyor after the components on the loaded storage tray are removed by a pick-up apparatus.

21. The automatic feeding system of claim 20, wherein each of the plurality of storage trays comprises a pair of engaging devices, each engaging device including a sliding plate configured to frictionally engage with and be driven by the loading conveyor and the unloading conveyor.

* * * * *